J. SKROBACZ.
BALLOON CYCLE.
APPLICATION FILED JULY 1, 1918.

1,285,818.

Patented Nov. 26, 1918.
2 SHEETS—SHEET 1.

INVENTOR
John Skrobacz.
BY
his ATTORNEY

J. SKROBACZ.
BALLOON CYCLE.
APPLICATION FILED JULY 1, 1918.
1,285,818.
Patented Nov. 26, 1918.
2 SHEETS—SHEET 2.
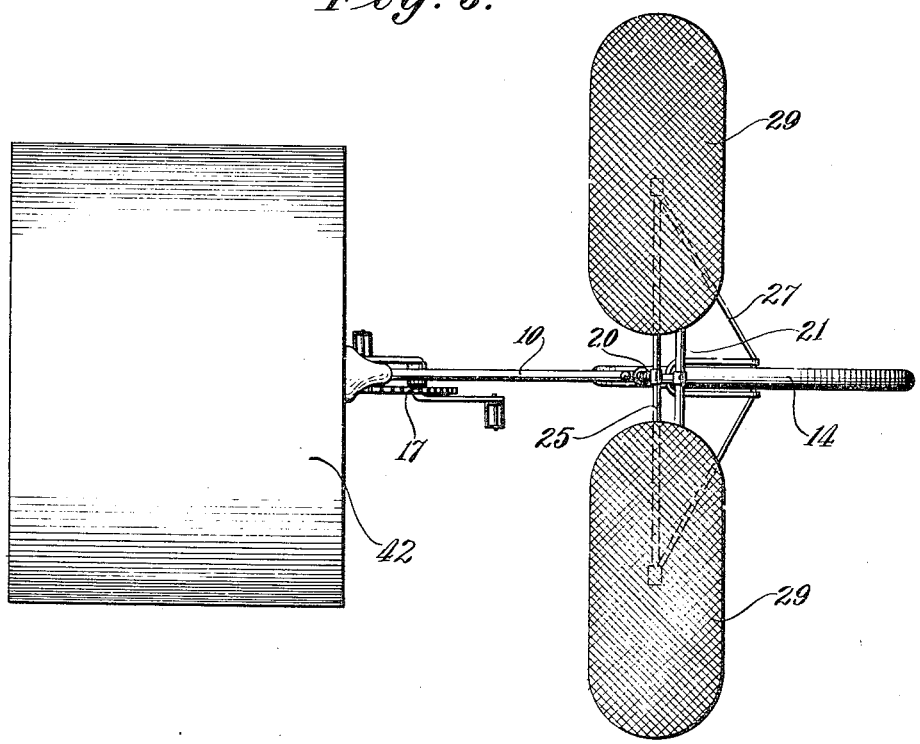
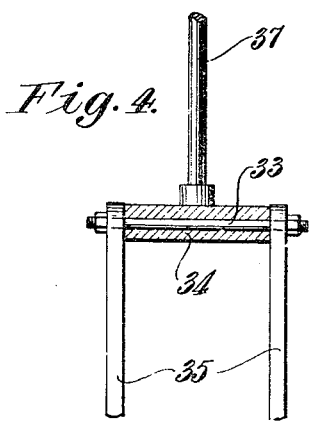
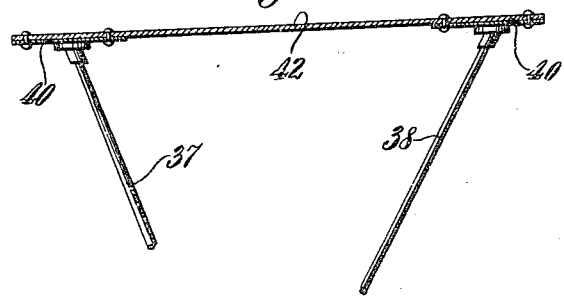
INVENTOR
John Skrobacz.
BY
his ATTORNEY

UNITED STATES PATENT OFFICE.

JOHN SKROBACZ, OF OLEAN, NEW YORK.

BALLOON-CYCLE.

1,285,818.  
Specification of Letters Patent.  
Patented Nov. 26, 1918.

Application filed July 1, 1918. Serial No. 242,890.

*To all whom it may concern:*

Be it known that I, JOHN SKROBACZ, a subject of the Emperor of Austria, residing at Olean, county of Cattaraugus, and State of New York, have invented certain new and useful Improvements in Balloon-Cycles, of which the following is a specification.

This invention relates to improvements in vehicles particularly in the types known as cycles.

The principal object of the invention is to provide means whereby a cycle is rendered partially buoyant, a considerable proportion of the weight of the rider and vehicle being supported by the balloon like element and plane, which in operation tends to raise the vehicle from the ground.

A further object is to provide such devices in forms which may be readily applied to bicycles of ordinary construction and which assist materially in their passage over the ground as they are propelled.

These and other like objects are attained by the novel construction and combination of parts hereinafter described and shown in the accompanying drawings, forming a material part of this specification, and in which:—

Fig. 3 is a top plan view of the same.

Fig. 4 is a fragmentary rear and sectional view showing the manner of attaching the parts to the bicycle, and Fig. 5 is a fragmentary transverse sectional view, taken on line 5—5 of Fig. 2.

Figure 1:
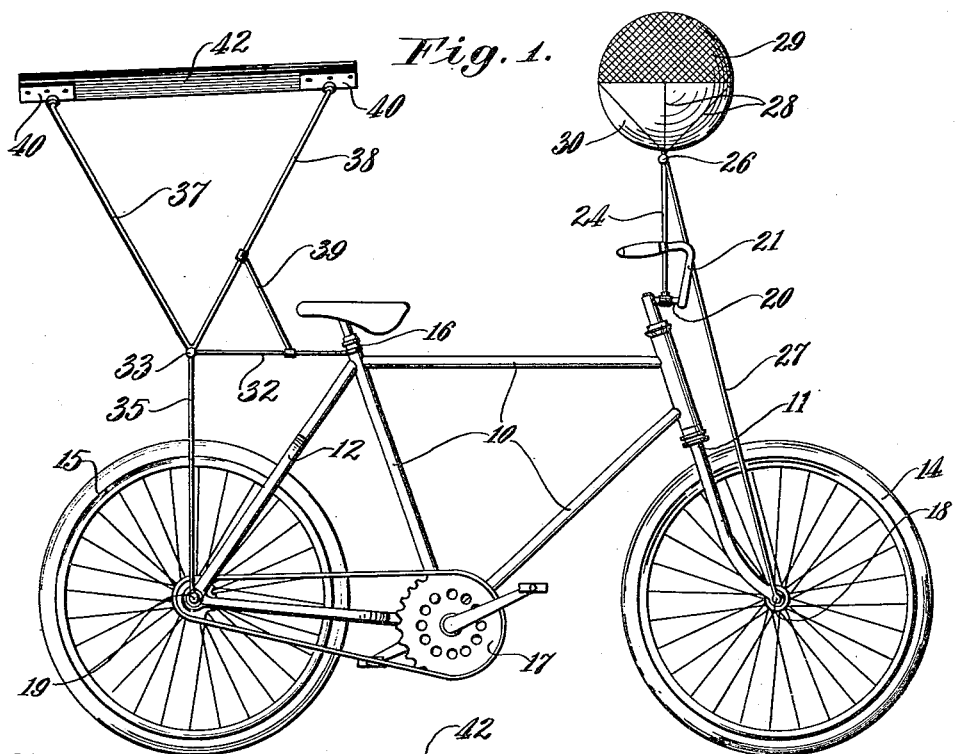
Figure 1 is a side elevational view, showing a conventional type of bicycle and indicating the application of the invention.
Figure 2:
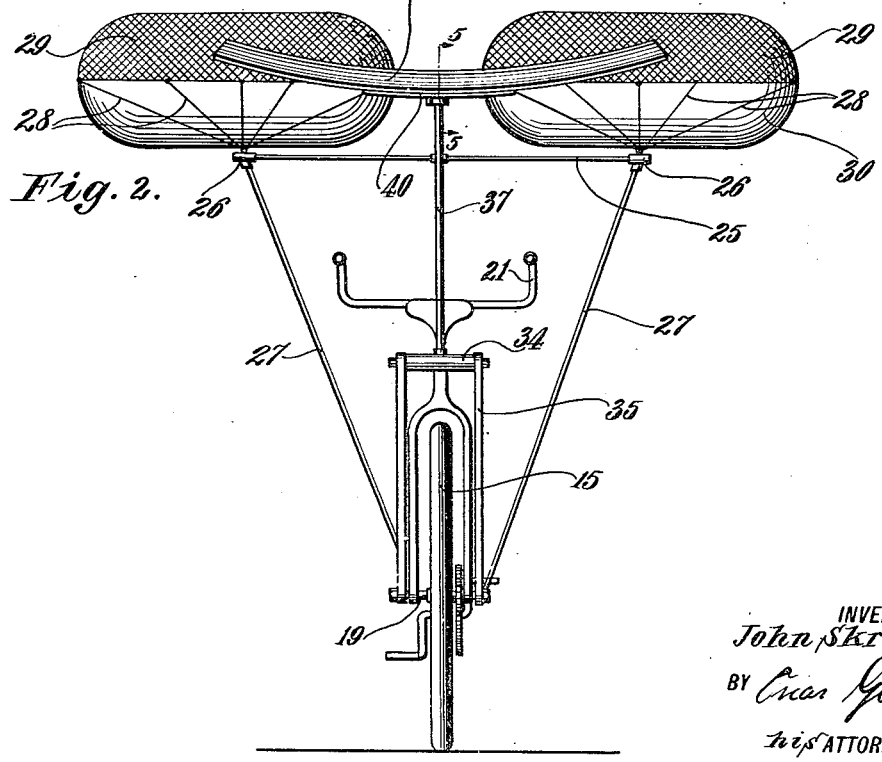
Fig. 2 is a rear view of the same.

The bicycle frame, which is of the usual diamond type of construction as indicated by the numeral 10, has at the front, steering forks 11 having between them, the front wheel 14, a rigid fork 12 at the rear connecting with the rear wheel 15, driven by pedally operated means 17 as is usual, as is also the mounting of the wheels upon axles 18 and 19.

Engaged with the stem 20 of the handle bars 21 is a vertical rod 24, connecting with a transverse bar 25, having secured at its end fittings 26 from which extend downwardly and to the front, guy rods 27, affixed upon the extending ends of the front axle 18, these rods acting as braces and supports for the transverse bar 25.

Engaged with fittings 26 are a plurality of wires 28, connected with inverted baskets 29, formed of woven wire or the like with an open mesh and in which are secured buoyant elements or balloons, comprised of sacs adapted to be filled by hydrogen or other like buoyant gas so as to partially carry the weight of the front of the vehicle.

Extending rearwardly of the seat post 16, is a bar 32 engaged with a sleeve 34 rotatably mounted on a bolt 33, while pivoted on the bolt 33 at the end of the sleeve, are a pair of bars 35, extending downward to the rear axle 19.

Extending up from the sleeve 34 are a pair of angularly disposed rods 37 and 38, the latter rod being connected by a brace 39 with the bar 32, while both of the rods 37 and 38 are engaged at their outer ends with bracket-like fittings 40, supporting a curved plate 42, slightly upturned at the front and acting in the manner of a plane, so that when the vehicle is propelled there is a buoyant effect tending to lift the vehicle, proportionately as its speed is increased.

It is to be noted that the balloon elements 30 are arranged at the front of the vehicle, while the curved raising plane 42 is at the rear, the rider resting upon the seat therebetween.

Thus if the balloons have been sufficiently inflated and the vehicle is driven at a high rate of speed, the combination of the balloons with the plane serve to materially assist in the operation of the vehicle by its rider in an obvious manner.

Having thus described my invention what I claim as new and desire to secure by Letters Patent, is.

In a balloon cycle, the combination with a cycle frame, of a horizontal rod rigidly engaged at the front of the frame, connections between the front axle and said horizontal rod, a pair of inverted baskets fixed at the ends of said horizontal bar, inflatable balloon elements in said baskets, a curved plate above said frame, and connections between said plate and frame whereby it is maintained in operative position.

In testimony whereof I have affixed my signature.

JOHN SKROBACZ.